B. W. DAVIS.
PNEUMATIC SPRING.
APPLICATION FILED NOV. 15, 1906.
1,152,609.
Patented Sept. 7, 1915.
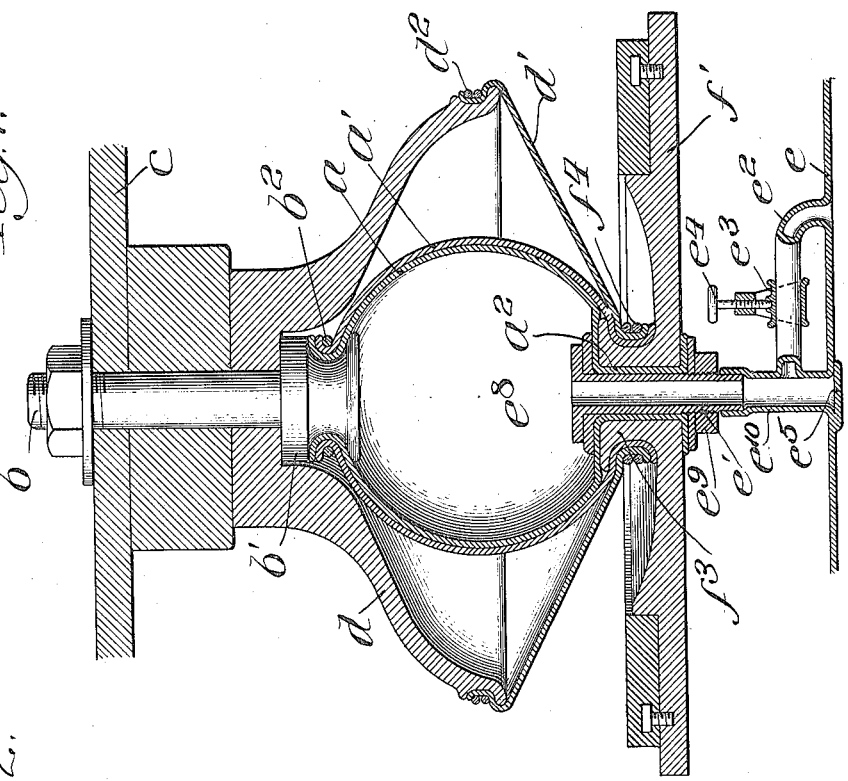
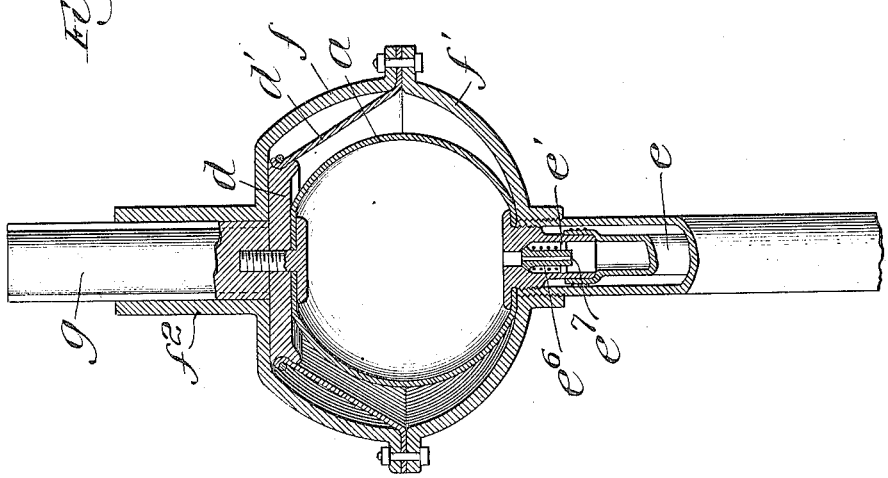
Witnesses:
Inventor:
Benjamin Walter Davis,
By Thomas F. Sheridan,
Atty.

UNITED STATES PATENT OFFICE.

BENJAMIN WALTER DAVIS, OF PHILLIPS, WISCONSIN.

PNEUMATIC SPRING.

1,152,609. Specification of Letters Patent. Patented Sept. 7, 1915.

Application filed November 15, 1906. Serial No. 343,574.

*To all whom it may concern:*

Be it known that I, BENJAMIN WALTER DAVIS, a citizen of the United States, residing at Phillips, in the county of Price and State of Wisconsin, have invented certain new and useful Improvements in Pneumatic Springs, of which the following is a specification.

My invention relates to pneumatic springs; and has for its object to provide an improved resilient support or spring which may be used as a substitute for the ordinary steel springs in those places where such springs are commonly used. Thus, I may use my improved spring as a resilient support for automobiles, carriages, bicycles or other vehicles, and as a resilient support for chairs, cushions or mattresses—in fact, it is capable of general application.

With these and other objects, which will hereinafter appear in view, my invention consists in the combinations and details hereinafter set forth and claimed.

In the accompanying drawing—Figure 1 is a transverse sectional elevation of one form of my improved spring. Fig. 2 is a similar view showing a modified form of the device.

In the accompanying drawing, in Fig. 1, I have shown my improved spring as a vehicle support, such as a support for automobiles, carriages or other vehicles, or as a support for a chair or other seat. In this figure $a$ represents a substantially globular bag of flexible material and $a'$ an outer covering of leather or similar material therefor. At its upper end this globular bag is connected to the head $b'$ of a bolt $b$. Any suitable fastening means may be used for this purpose. I have shown a wire $b^2$, which, when tightened, serves to draw the edges of the bag into the grooved portion of the bolt head. This bolt $b$ is attached to a part $c$ which may represent the body of a vehicle, or car, or a seat. At its lower end the outer cover of the globular bag is secured in a similar manner to a neck $f^3$ on a base $f'$. This base $f'$ may represent part of the underframe of an automobile or carriage, or the supporting stand of a chair. Wires $f^4$ serve to secure the outer portion of the globular bag to the neck. This neck is provided with a passageway, and an elongated neck $a^2$ of the inner bag extends through this passageway. A metallic lining $e'$, having a flanged end $e^8$, serves to secure the lower portion of the inner bag to the neck $f^3$, the lower end of this lining being screw threaded to receive a nut $e^6$. Connected to the lower end of this metallic lining is the neck $e^{10}$ of a relief chamber $e$, and a check valve $e^5$ permits the passage or air from the globular bag through the lining $e'$ and neck $e^{10}$ to the relief chamber. This relief chamber may be formed with walls of flexible material or unflexible material, as may be desired. The check valve $e^5$, while permitting the passage of air from the globular chamber to the relief chamber, prevents its return from the relief chamber to the globular chamber. A passageway $e^2$, however, connects the relief chamber with the neck $e^{10}$. The passageway $e^2$ is of such size in relation to the passageway $e'$, $e^{10}$ as to permit a less quantity of air in a given time to pass back from the relief chamber than passes from the globular chamber to the relief chamber—that is to say, while the passage of air from the globular chamber is comparatively unrestricted, the return of air to the globular chamber is restricted. A clamp $e^3$ surrounds the passageway $e^2$, the walls of which are flexible, and a screw $e^4$ operates this clamp so as to regulate the return of air, which may be restricted more or less as desired. A covering $d$, which may be of metal, if so desired, surrounds the upper portion of the globular chamber and flares downwardly and outwardly—as clearly shown in Fig. 1. To the lower edge of this covering is connected a flexible cover $d'$ of leather or light material, this leather covering being secured to the metallic covering by wires $a^2$ at its upper edge and to the neck $f^3$ at the base by wires $f^4$.

The operation of my device is as follows: When weight is supported upon the spring, the globular bag tends to flatten out, resting at its lower portion upon the base $f'$, the upper portion of such globular bag engaging the walls of the covering $d$. Thus, as the weight supported by the spring increases, the supporting area of the spring is correspondingly increased. If the spring is subjected to sudden shocks, the air therein will be forcibly expelled through the unrestricted passageway $e'$, $e^{10}$ and permitted to enter the relief chamber $e$. Owing to its restricted return, however, the sudden return of the spring is prevented—on the contrary, the return is made easy and gradually.

Thus, the great objection to pneumatic springs of this type is overcome,—that is, the excessive vibration thereof. It will be understood that the air in the relief chamber $e$ is kept at any desired pressure and serves to maintain the pressure in the spring.

In Fig. 2 I have shown my spring as applied to a bicycle seat support. In this case $g$ represents the seat stem which is longitudinally mounted in a neck $f^2$ attached to the upper half $f$ of a globular chamber, the lower portion $f'$ being attached to the seat support. Within this globular chamber, the walls of which are rigid, I mount the globular bag $a$ as in the form described above. The cover $d$ in this instance is in the form of a flat plate, and the leather covering $d'$ is secured between the walls $f, f'$, of the globular chamber. The relief chamber $e$ in this case is in the form of a long tube extending down into the seat support and the valve between the spring and the relief chamber is shown at $e^6$, being provided with a restricted passageway $e^7$. It will be understood that when the valve is removed from its seat by the downward pressure of the air in the spring an unrestricted flow is permitted from the spring to the relief chamber, while the return of air from the relief chamber to the spring is only through the restricted passage $e^7$. The operation of this form of spring is substantially the same as of the first described. When weight is applied to the bicycle seat, the tendency of the spring is to flatten out, the lower portion being supported upon the wall $f'$ of the globular chamber, while the upper portion has an extended bearing on the cover $d$, thus increasing the area of support as the weight increases. If desired I may provide a restricted passage for the air in both directions, as will be readily understood.

The operation of my improved device will be understood without further description.

I claim:

1. A pneumatic spring comprising a substantially globular fluid retaining chamber having flexible walls, curved means engaging the flexible walls of the retaining chamber to increase the supporting area thereof at a predetermined rate when weight is applied thereto, and means for connecting said chamber to two relatively movable members between which the chamber is interposed.

2. A pneumatic spring comprising a substantially globular fluid retaining chamber having flexible walls, rigid means engaging the flexible walls of the fluid retaining chamber adapted to distribute the load when weight is applied thereto, and means for connecting said chamber to two relatively movable members between which the chamber is interposed.

3. A pneumatic spring comprising a flexible fluid retaining chamber, means for connecting said chamber to two relatively movable members respectively, means whereby the supporting area of the chamber is increased as the weight thereon is increased, means for quickly relieving the chamber of a portion of the fluid therein, and means for gradually restoring the fluid to the fluid chamber.

4. A pneumatic spring comprising a flexible fluid retaining chamber, means for connecting said chamber to two relatively movable members respectively, means whereby the supporting area of the chamber is increased as the weight thereon is increased, a fluid relief chamber connected to the retaining chamber, and means for controlling the flow of fluid from the relief chamber to the retaining chamber.

5. A pneumatic spring comprising a flexible fluid retaining chamber, means for connecting said chamber to two relatively movable members respectively, a relief chamber connected to the fluid retaining chamber, and rigid means engaging the walls of the retaining chamber when weight is applied thereto.

6. A pneumatic spring comprising a substantially globular fluid retaining chamber having flexible walls, means for connecting said chamber to two relatively movable members respectively, a relief chamber, a passageway between the fluid retaining and relief chambers, means providing for the unrestricted flow of fluid from the fluid retaining chamber to the relief chamber and for a restricted return flow from the relief chamber to the fluid retaining chamber, and rigid means engaging the walls of the fluid retaining chamber when weight is applied thereto.

7. A pneumatic spring comprising a substantially globular fluid retaining chamber having flexible walls, a flat base lying against the chamber on one side thereof, a concave cover opposed thereto, and a flexible cover from the base to the edge of the concave cover, these members completely inclosing the said chamber.

8. A pneumatic spring comprising a substantially globular fluid retaining chamber having flexible walls, rigid bearing members engaging said walls above and below respectively when said spring is subject to a load, and means for fastening the upper and lower parts of said chamber to said rigid members respectively.

9. A pneumatic spring comprising a substantially globular fluid retaining chamber having flexible walls, rigid means engaging the flexible walls of the fluid retaining chamber adapted to distribute the load, and screws having flanges adapted to engage the upper and lower sides of said chamber and secure same against the said rigid means respectively.

10. A pneumatic spring comprising a substantially globular fluid retaining chamber having flexible walls, means for connecting said chamber to two relatively movable members between which the chamber is interposed, a telescopic protecting casing surrounding said fluid retaining chamber, and means for connecting said casing to the two relatively movable members between which said chamber is interposed.

BENJAMIN WALTER DAVIS.

Witnesses:
W. T. JONES,
ANNA L. SAVOIE.